United States Patent
Chen et al.

(10) Patent No.: US 9,968,193 B1
(45) Date of Patent: May 15, 2018

(54) SLIDE RAIL ASSEMBLY WITH SWITCH

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days. days.

(21) Appl. No.: 15/659,573

(22) Filed: Jul. 25, 2017

(30) Foreign Application Priority Data

Mar. 20, 2017 (TW) .............................. 106109437 A (51) Int. Cl.
*A47B 88/00* (2017.01)
*A47B 88/47* (2017.01)
*A47B 88/477* (2017.01)
*A47B 88/447* (2017.01)
*F03G 1/10* (2006.01)
*A47B 88/423* (2017.01)

(52) U.S. Cl.
CPC ............ *A47B 88/47* (2017.01); *A47B 88/447* (2017.01); *A47B 88/477* (2017.01); *A47B 2088/4235* (2017.01); *F03G 1/10* (2013.01)

(58) Field of Classification Search
CPC ......... A47B 88/47; A47B 88/44; A47B 88/45; A47B 88/453; A47B 88/46; A47B 88/463; A47B 88/467; A47B 2088/4235
See application file for complete search history.

(56) References Cited

U.S. PATENT DOCUMENTS

| 5,303,995 | A | 4/1994 | Kurihara | |
|---|---|---|---|---|
| 7,374,261 | B1 * | 5/2008 | Wang | A47B 88/463 312/319.1 |
| 8,100,487 | B2 | 1/2012 | Liang | |
| 8,172,345 | B2 | 5/2012 | Liang | |
| 9,750,347 | B2 * | 9/2017 | Nuckolls | A47B 88/463 |
| 2005/0093406 | A1 * | 5/2005 | Yang | A47B 88/467 312/333 |
| 2007/0278919 | A1 * | 12/2007 | Lu | A47B 88/467 312/333 |
| 2009/0140621 | A1 * | 6/2009 | Yang | A47B 88/467 312/319.1 |

(Continued)

FOREIGN PATENT DOCUMENTS

EP          3 000 355 A1     3/2016

*Primary Examiner* — Daniel J Rohrhoff
(74) *Attorney, Agent, or Firm* — Winston Hsu (57) ABSTRACT

A slide rail assembly includes a first rail, a second rail, a first driving device, a second driving device and a switch. The second rail is movable relative to the first rail. The first driving device is configured to drive the second rail to open relative to the first rail when the second rail is pushed at a retracted position along a first direction. The second driving device is configured to drive the second rail to close relative to the first rail when the second rail is moved from an open position to a predetermined position. The switch is configured to enable the first driving device in a first state and disable the first driving device in a second state.

20 Claims, 13 Drawing Sheets

(56) References Cited

U.S. PATENT DOCUMENTS

| | | | |
|---|---|---|---|
| 2011/0043087 A1* | 2/2011 | Shih | A47B 88/467 312/334.1 |
| 2012/0144622 A1* | 6/2012 | Juan | A47B 88/467 16/51 |
| 2013/0004101 A1* | 1/2013 | Chen | A47B 88/463 384/10 |
| 2014/0319986 A1 | 10/2014 | Brunnmayr | |
| 2017/0049231 A1* | 2/2017 | Fellner | A47B 88/0477 |
| 2017/0135479 A1* | 5/2017 | Chen | F03G 1/10 |
| 2017/0265644 A1* | 9/2017 | Fischer | A47B 88/467 |
| 2018/0014643 A1* | 1/2018 | Chen | A47B 88/463 |

* cited by examiner

SLIDE RAIL ASSEMBLY WITH SWITCH

BACKGROUND OF THE INVENTION

1. Field of the Invention

The present invention relates to a slide rail assembly, and more particularly, to a slide rail assembly with a switch. The slide rail assembly has a push-open function and a self-closing function, and the switch allows a user to enable or disable the push-open function of the slide rail assembly according to use environment or conditions.

2. Description of the Prior Art

U.S. Pat. No. 8,172,345 B2 of Liang et al. discloses a slide rail assembly having a push-open function and a self-closing function.

When a drawer is mounted to a cabinet through a slide rail assembly with the push-open function, and the drawer is retracted into the cabinet, an obvious pushing gap is formed between a front panel of the drawer and the cabinet. The pushing gap allows a user to push the drawer to move relative to the cabinet, such that the drawer can be opened relative to the cabinet by a push-ejection mechanism arranged on the slide rail assembly. Since the push-open type drawer does not need to install an additional hand grip on the front panel of the drawer, the drawer allows the front panel to have a flat and neat appearance. On the other hand, the so-called self-closing slide rail assembly allows an opened drawer to be retracted relative to the cabinet by a self-closing mechanism of the slide rail assembly in an end process of the drawer being pushed into the cabinet.

The slide rail assembly with the push-open function and the self-closing function allows the user to open or close the drawer conveniently. However, the slide rail assembly with the push-open function may have an obvious pushing gap formed between the drawer and the cabinet, such that dusts, bugs or other foreign objects can enter the drawer easily. Moreover, the slide rail assembly with the push-open function is not suitable for a drawer which is required to be locked.

SUMMARY OF THE INVENTION

The present invention relates to a slide rail assembly with a switch, which allows a user to enable or disable a push-open function of the slide rail assembly according to use environment or conditions.

According to an embodiment of the present invention, a slide rail assembly comprises a first rail; a second rail movable relative to the first rail; a first driving device configured to drive the second rail to open relative to the first rail when the second rail is pushed at a retracted position along a first direction; a second driving device configured to drive the second rail to close relative to the first rail when the second rail is moved from an open position to a predetermined position along the first direction; and a switch configured to enable the first driving device in a first state and disable the first driving device in a second state.

Preferably, the first driving device is arranged on the second rail. The first driving device comprises a first elastic member and a locking mechanism. The first elastic member is configured to provide a first elastic force along a direction opposite to the first direction. The locking mechanism is configured to be operated between a locking state and an unlocking state. When the locking mechanism is in the locking state, the first elastic member accumulates the first elastic force. when the locking mechanism in the unlocking state, the first elastic member releases the first elastic force.

Preferably, the second driving device is arranged on the second rail. The second driving device comprises a second elastic member, a guiding mechanism and a capturing mechanism. The second elastic member is configured to provide a second elastic force along a direction identical to the first direction. A fixed feature is fixedly arranged on the first rail. The guiding mechanism has a first path and a second path deflected relative to the first path. When the capturing mechanism is located in the first path of the guiding mechanism, the fixed feature is captured by the capturing mechanism. When the capturing mechanism is located in the second path of the guiding mechanism, the capturing mechanism is detached from the fixed feature.

Preferably, the switch is movably mounted to the second rail. The first rail comprises an abutting feature. When the switch is in the first state, a predetermined gap is formed between the switch and the abutting feature for enabling the first driving device. When the switch is in the second state, the switch abuts against or is adjacent to the abutting feature for disabling the first driving device.

Preferably, the slide rail assembly further comprises a base attached to the second rail. The second rail is formed with an opening for allowing the base to pass through. The switch is movably mounted to the base.

Preferably, the switch is a manual switch.

According to another embodiment of the present invention, a slide rail assembly comprises a first rail configured to be mounted to a first furniture part of a furniture assembly; a second rail movable relative to the first rail, the second rail configured to carry a second furniture part of the furniture assembly; a first driving device configured to drive the second furniture part to open relative to the first furniture part when the second rail is pushed at a retracted position along a first direction; a second driving device configured to drive the second furniture part to close relative to the first furniture part when the second rail is moved from an open position to a predetermined position along the first direction; and a switch configured to enable the first driving device in a first state and disable the first driving device in a second state.

According to another embodiment of the present invention, a slide rail assembly comprises a first rail; a second rail movable relative to the first rail; a third rail movably arranged between the first rail and the second rail; a first driving device configured to drive the second rail to open relative to the first rail when the second rail is pushed at a retracted position along a first direction; and a switch operatively connected to the second rail, the switch configured to be operated between a first state and a second state. When the switch is in the first state, the switch is configured to enable the first driving device. When the switch is in the second state, the switch is configured to disable the first driving device.

Preferably, the slide rail assembly further comprises a second driving device configured to drive the second rail to close relative to the first rail when the second rail is moved from an open position to a predetermined position along the first direction.

Preferably, the first rail is mounted to a first furniture part. The second rail is configured to carry a second furniture part.

Preferably, the first furniture part is a cabinet, and the second furniture part is a drawer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
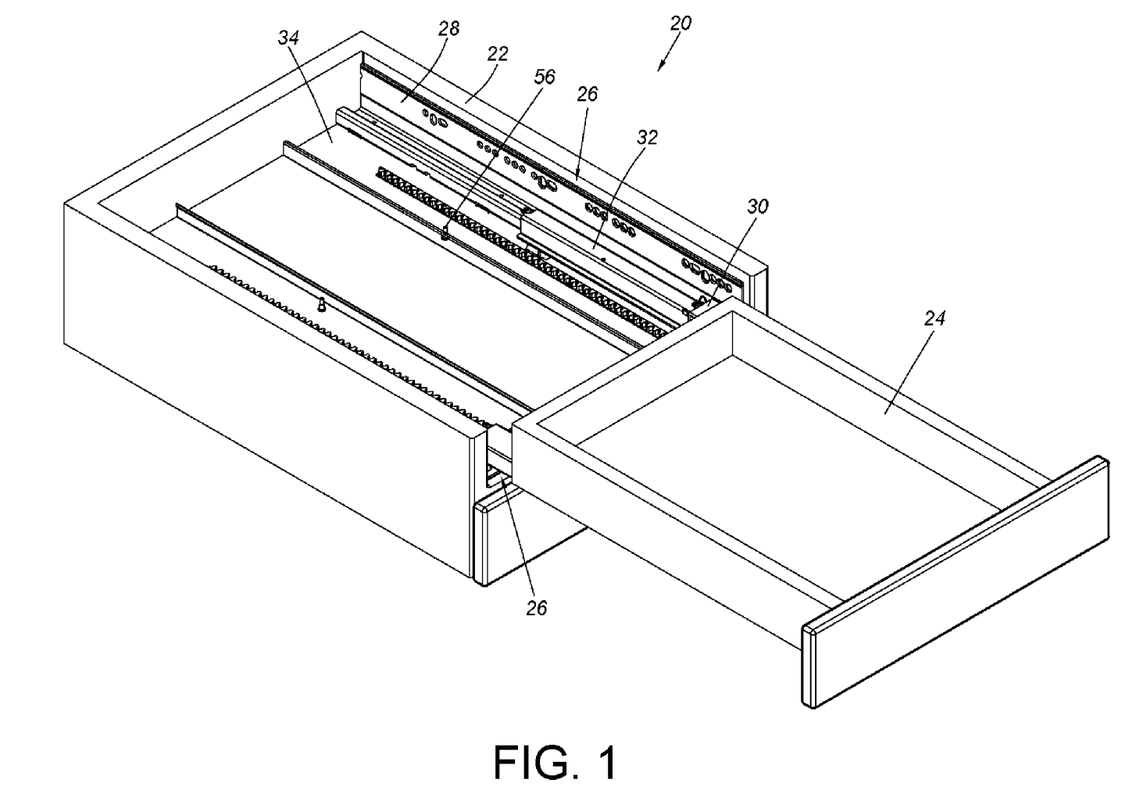
FIG. 1 is a diagram showing slide rail assemblies applied to a first furniture part and a second furniture part according to an embodiment of the present invention, wherein the second furniture part is opened relative to the first furniture part.
Figure 2:
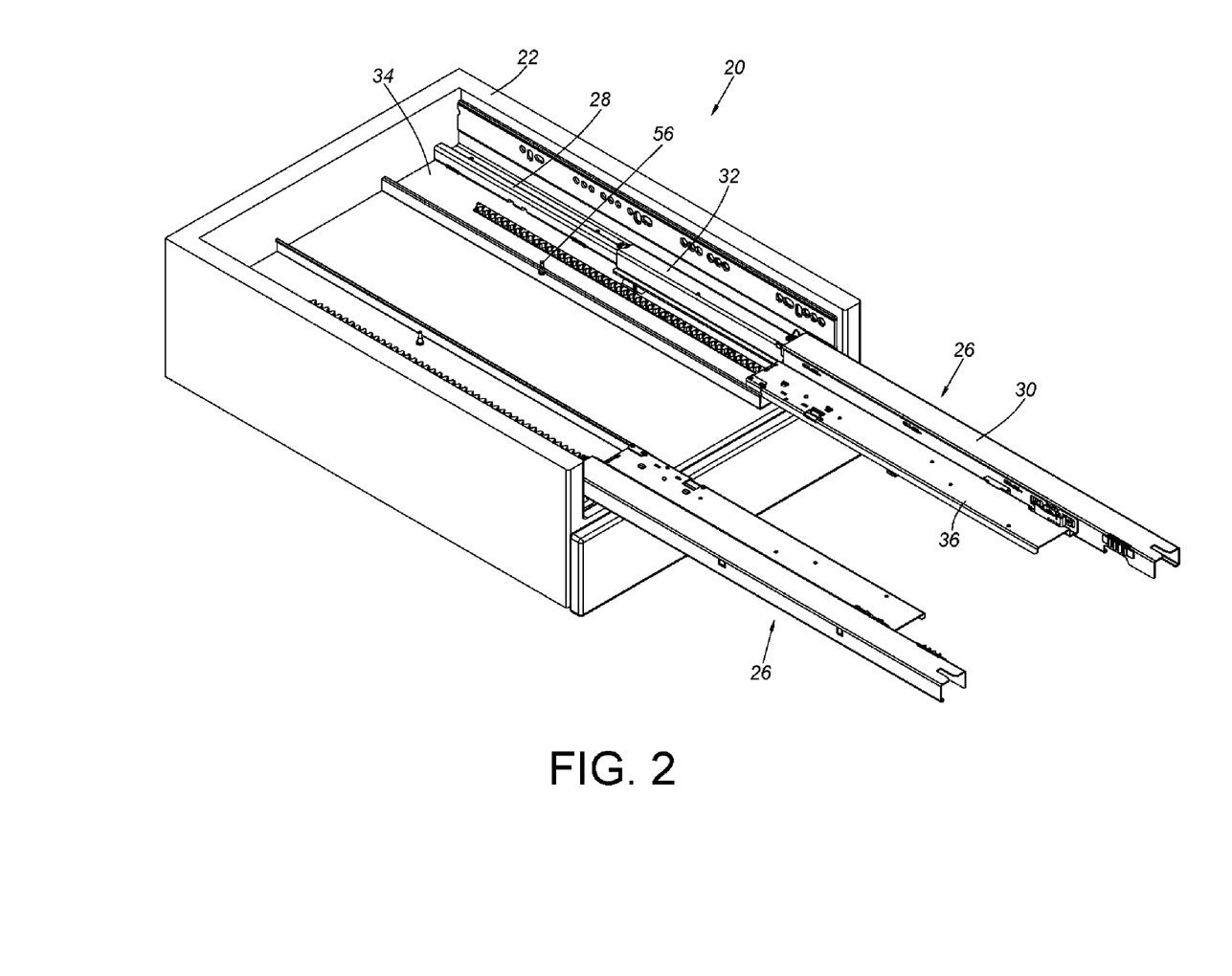
FIG. 2 is a diagram showing the slide rail assembly of FIG. 1 without the opened second furniture part.

FIG. 1 and FIG. 2 show a furniture assembly 20 comprising a first furniture part 22 and a second furniture part 24 according to an embodiment of the present invention. In the present embodiment, the first furniture part 22 is a cabinet, and the second furniture part 24 is a drawer, but the present invention is not limited thereto. Preferably, with assistance of a pair of slide rail assemblies 26, the second furniture part 24 is movable relative to the first furniture part 22.

Specifically, each of the slide rail assemblies 26 comprises a first rail 28 and a second rail 30 movable relative to the first rail 28. Preferably, the slide rail assembly 26 further comprises a third rail 32 movably arranged between the first rail 28 and the second rail 30 for extending a traveling distance of the second rail 30 relative to the first rail 28. Wherein, the first rail 28 is mounted to the first furniture part 22, such that the first rail 28 can be seen as a portion of the first furniture part 22. On the other hand, the second rail 30 is mounted to the second furniture part 24 for carrying the second furniture part 24, such that the second rail 30 can be seen as a portion of the second furniture part 24. Preferably, the first rail 28 comprises an extension part 34, and the second rail 30 comprises a carrying part 36.

Figure 3:
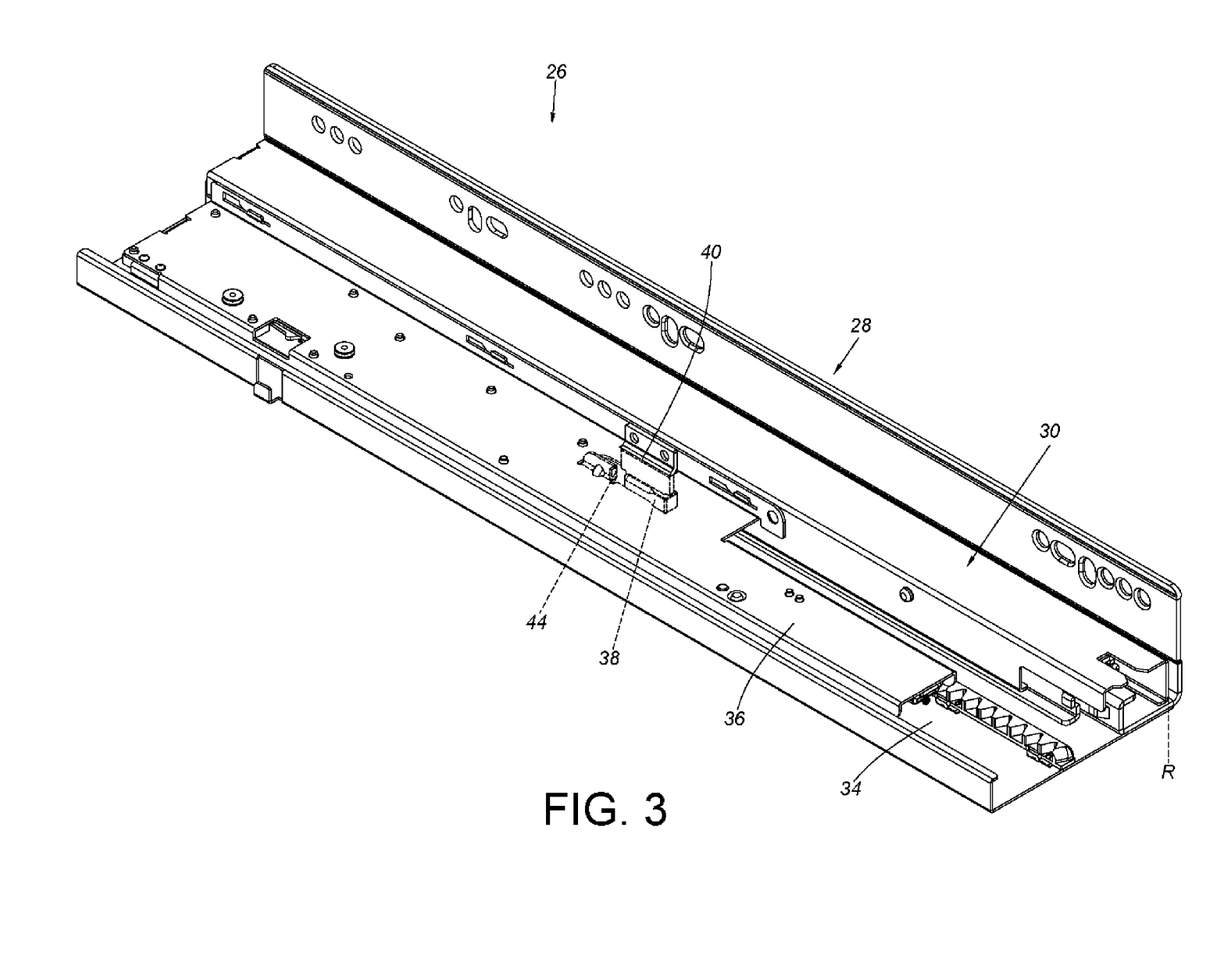
FIG. 3 is a diagram showing the slide rail assembly according to an embodiment of the present invention.

As shown in FIG. 3, the second rail 30 is located at a retracted position R relative to the first rail 28. When the second rail 30 is at the retracted position R, the position of the carrying part 36 of the second rail 30 substantially corresponds to the extension part 34 of the first rail 28.

Figure 4:
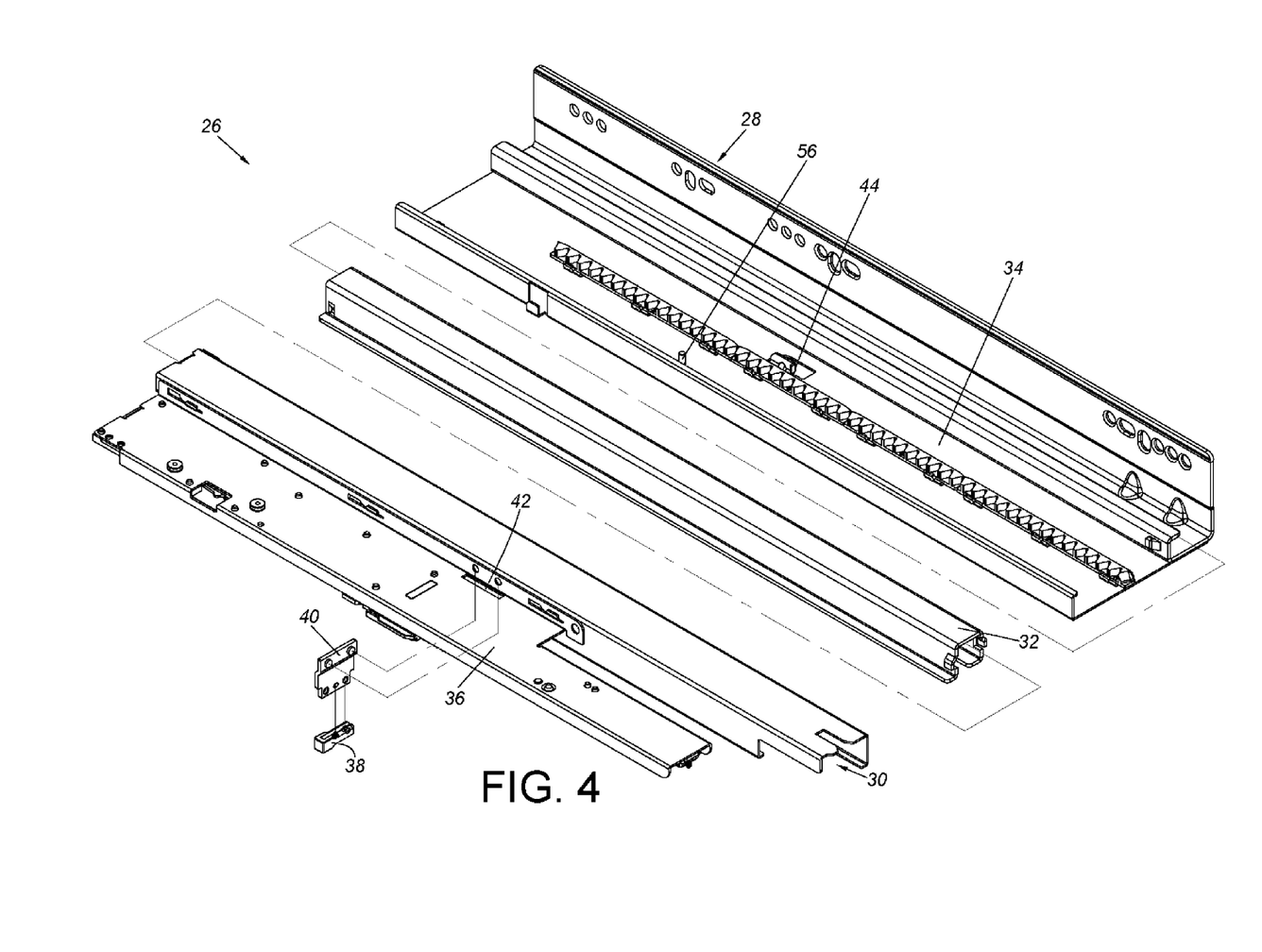
FIG. 4 is an exploded view of the slide rail assembly according to an embodiment of the present invention.

As shown in FIG. 4, the slide rail assembly 26 further comprises a switch 38. Preferably, the switch 38 is a manual switch and is operatively connected to one of the first rail 28 and the second rail 30 of the slide rail assembly 26. In the present embodiment, the switch 38 is operatively connected to the second rail 30. Preferably, the slide rail assembly 26 further comprises a base 40 attached to the second rail 30. The carrying part 36 of the second rail 30 is formed with an opening 42 for allowing the base 40 to pass through. Wherein, the base 40 can be fixed to the second rail 30 by riveting, screwing, engaging or welding. As such, the base 40 can be seen as a portion of the second rail 30. Or, the base 40 can be directly and integrally formed on the second rail 30, but the present invention is not limited thereto.

The switch 38 can be movably mounted (such as pivoted) to the base 40 of the second rail 30, or the switch 38 can be detachably mounted to the base 40 of the second rail 30, but the present invention is not limited thereto. On the other hand, the first rail 28 comprises an abutting feature 44. The abutting feature 44 can be an element attached to the first rail 28, or the abutting feature 44 can be directly formed on the first rail 28. In the present embodiment, the abutting feature 44 is formed as a wall structure located on the extension part 34.

Figure 5:
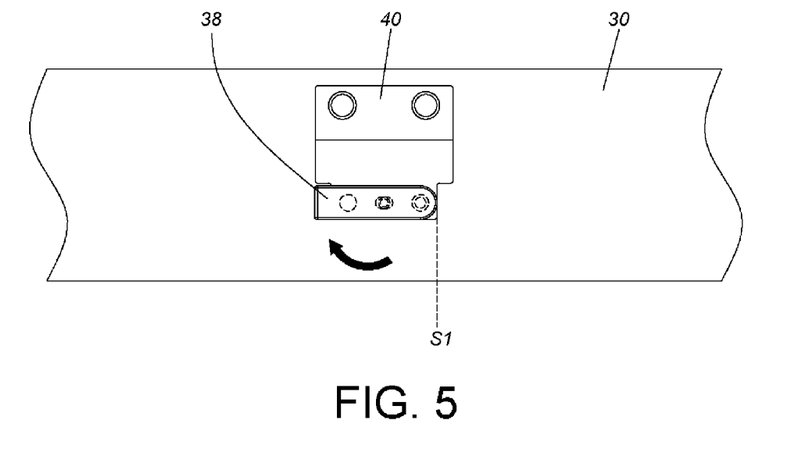
FIG. 5 is a diagram showing a switch of the slide rail assembly in a first state according to an embodiment of the present invention.
Figure 6:
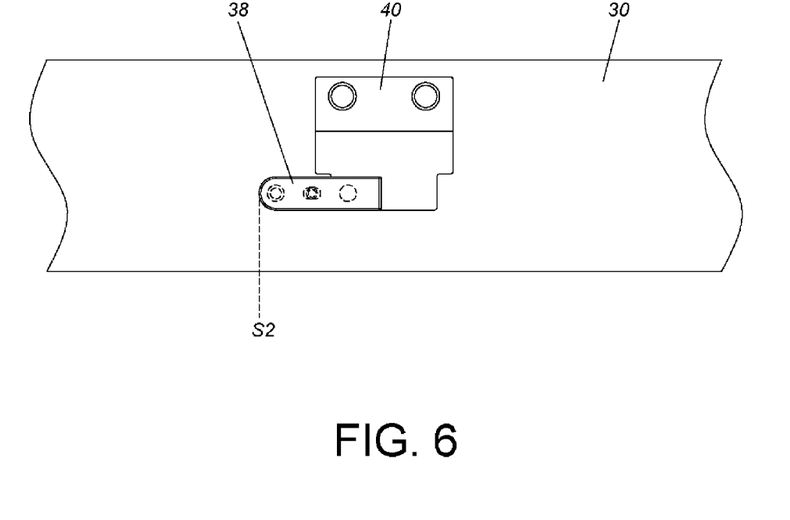
FIG. 6 is a diagram showing the switch of the slide rail assembly in a second state according to an embodiment of the present invention.

As shown in FIG. 5 and FIG. 6, the switch 38 is configured to be operated between a first state S1 and a second state S2 relative to the second rail 30.

Figure 7:
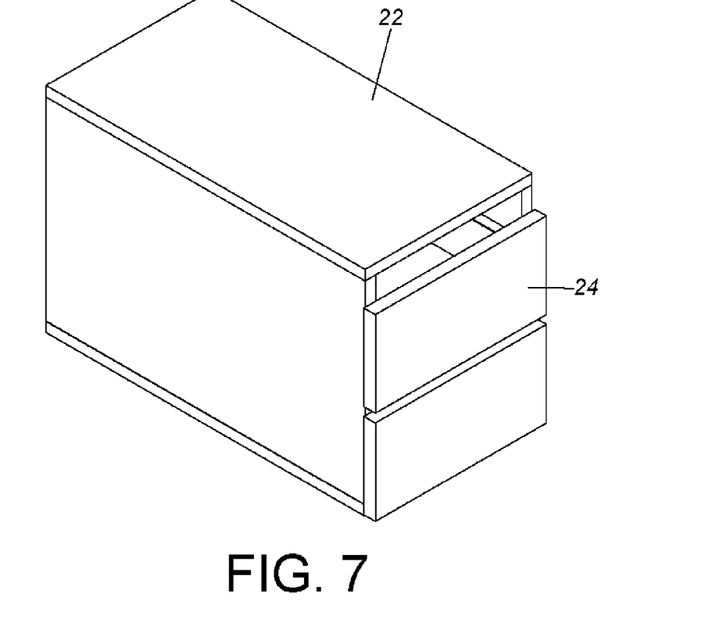
FIG. 7 is a diagram showing a furniture assembly comprising the first furniture part and the second furniture part in a closed state according to an embodiment of the present invention.
Figure 8:
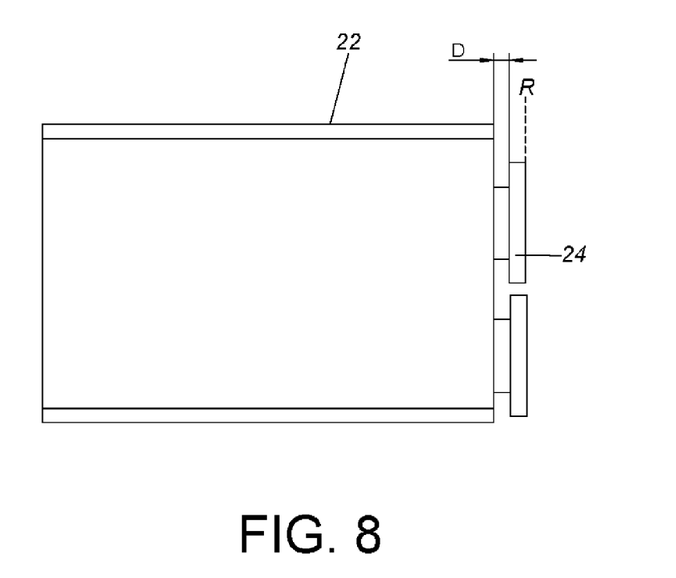
FIG. 8 is a side view of the furniture assembly of FIG. 7.

As shown in FIG. 7 and FIG. 8, when the second furniture part 24 is arranged in a push-open mode relative to the first furniture part 22 and is located at the retracted position R, a distance D is defined between the second furniture part 24 and the first furniture part 22 to form a pushing gap, in order to allow a user to push the second furniture part 24 to move relative to the first furniture part 22, such that the second furniture part 24 can be opened relative to the first furniture part 22.

Figure 9:
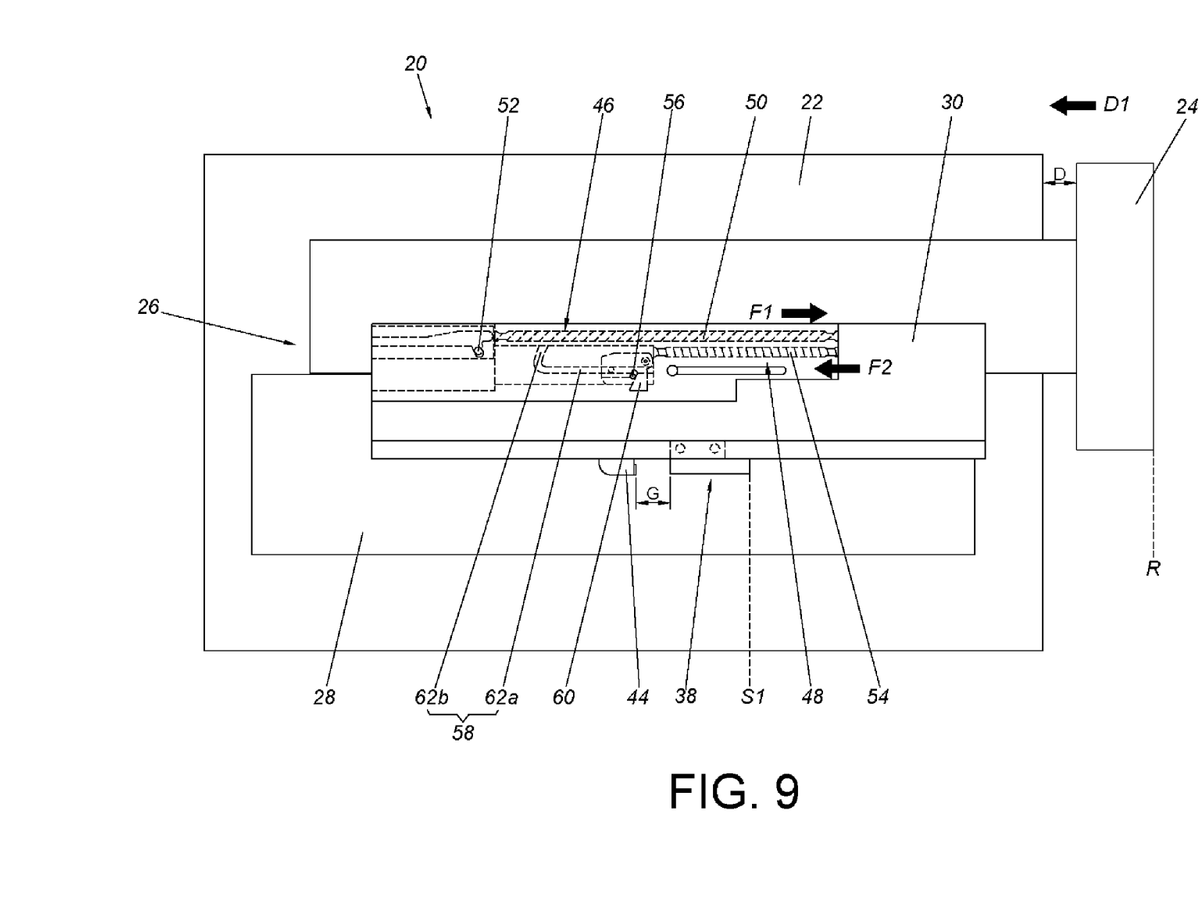
FIG. 9 is a diagram showing the second furniture part of the furniture assembly being located at a retracted position relative to the first furniture part according to an embodiment of the present invention, wherein the switch is in the first state.

As shown in FIG. 9, the slide rail assembly 26 comprises a first driving device 46 and a second driving device 48. The first driving device 46 is arranged on the second rail 30. The first driving device 46 comprises a first elastic member 50 and a locking mechanism 52. The first elastic member 50 is configured to provide a first elastic force F1. The locking mechanism 52 is configured to be operated between a locking state and an unlocking state. When the locking mechanism 52 is in the locking state, the first elastic member 50 accumulates the first elastic force F1. When the locking mechanism 52 is in the unlocking state, the first elastic member 50 releases the first elastic force F1. In particular, when the second furniture part 24 is located at the retracted position R relative to the first furniture part 22 and the pushing gap exists between the second furniture part 24 and the first furniture part 22, the locking mechanism 52 is in the locking state.

The second driving device 48 is also arranged on the second rail 30. The second driving device 48 comprises a second elastic member 54, a guiding mechanism 58, and a capturing mechanism 60. The second elastic member 54 is configured to provide a second elastic force F2. A direction of the second elastic force F2 is opposite to a direction of the first elastic force F1. A fixed feature 56 is fixedly arranged on the first rail 28. The fixed feature 56 can be a fixed pin shown in FIG. 4. The guiding mechanism 58 has a first path 62a and a second path 62b deflected relative to the first path 62a. When the capturing mechanism 60 is located in the first path 62a of the guiding mechanism 58, the fixed feature 56 is captured by the capturing mechanism 60. When the capturing mechanism 60 is located in the second path 62b of the guiding mechanism 58, the capturing mechanism 60 is detached from the fixed feature 56 (please refer to FIG. 11). In particular, when the second furniture part 24 is located at the retracted position R relative to the first furniture part 22, and the pushing gap exists between the second furniture part 24 and the first furniture part 22, the capturing mechanism 60 is located in the first path 62a of the guiding mechanism 58, and the fixed feature 56 is captured by the capturing mechanism 60. Meanwhile, the second elastic member 54 accumulates the second elastic force F2 in an initial state.

Preferably, when the second furniture part 24 (or the second rail 30) is located at the retracted position R relative to the first furniture part 22 (or the first rail 28), and the switch 38 is in the first state S1, a predetermined gap G is formed between the switch 38 and the abutting feature 44 of the first rail 28. The predetermined gap G is substantially equal to the pushing gap (the distance D). As such, the first driving device 46 is enabled.

Figure 10:
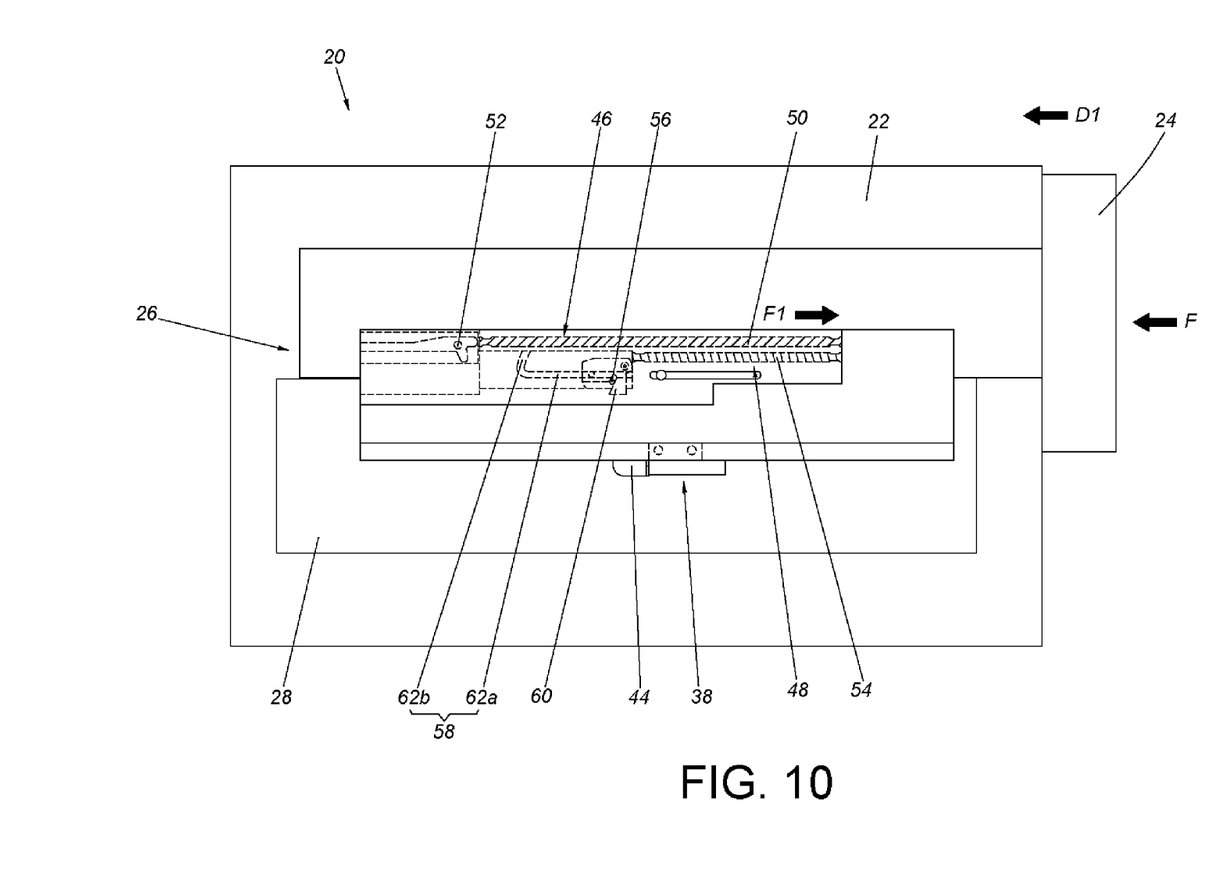
FIG. 10 is a diagram showing a pushing force being applied to the second furniture part along a first direction.
Figure 11:
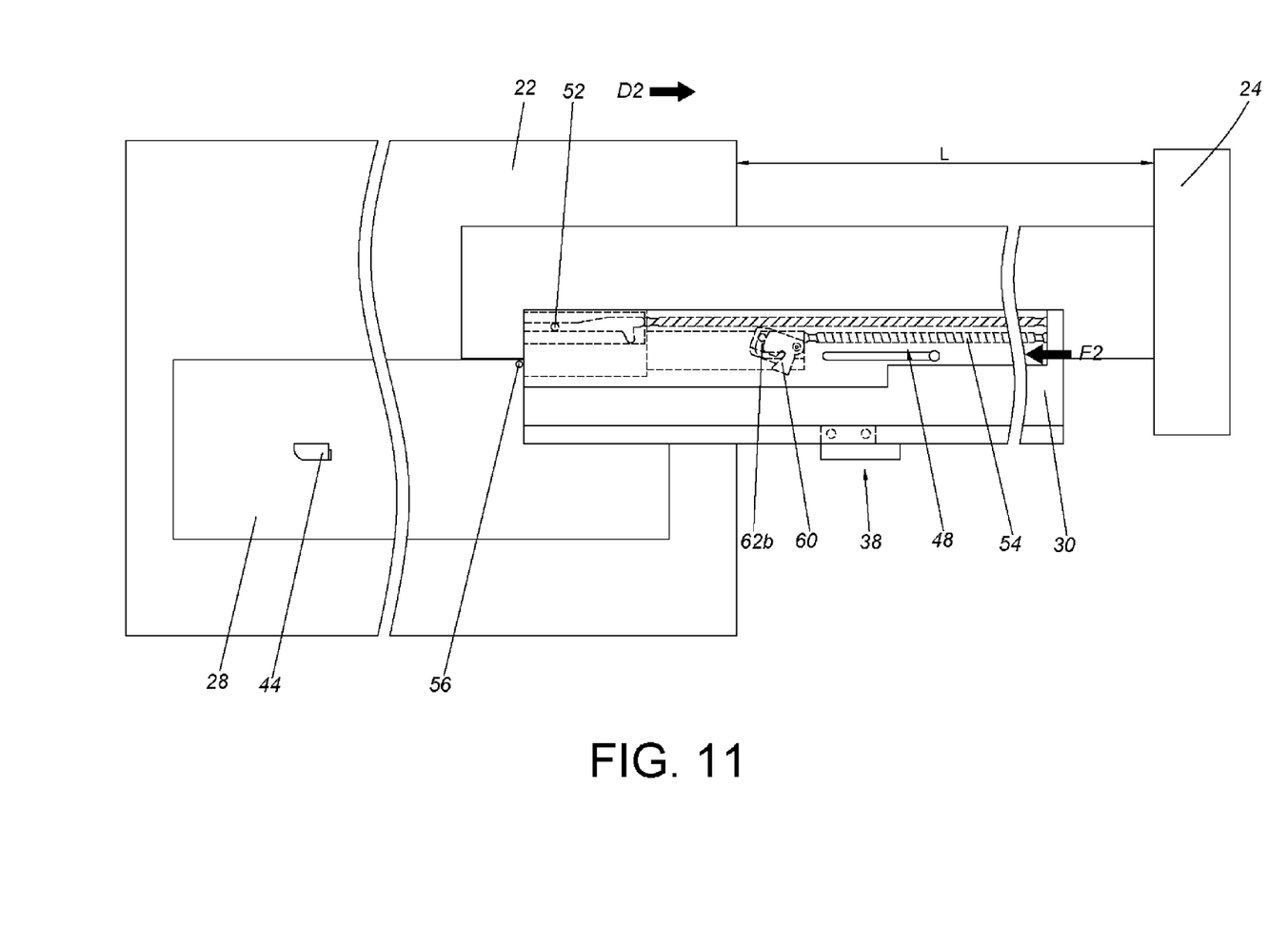
FIG. 11 is a diagram showing the second furniture part being ejected to open relative to the first furniture part along a second direction by a first driving device.

As shown in FIG. 10 and FIG. 11, when a user applies a pushing force F to the second furniture part 24 (or the second rail 30) along a first direction D1, the locking mechanism 52 of the first driving device 46 is operated to switch from the locking state to the unlocking state. When the pushing force F is no longer applied to the second furniture part 24, the first elastic member 50 of the first driving device 46 releases the first elastic force F1, such that the second furniture part 24 is opened relative to the first furniture part 22 to move an extension distance L relative to the first furniture part 22 along a second direction D2. That is so-called a "push-open" function. Wherein, the second direction D2 is opposite to the first direction D1, and the direction of the first elastic force F1 of the first driving device 46 is opposite to the first direction D1.

In the push-open process, the capturing mechanism 60 of the second driving device 48 is moved from the first path 62a to the second path 62b of the guiding mechanism 58. When the capturing mechanism 60 is located in the second path 62b of the guiding mechanism 58, the capturing mechanism 60 is detached from the fixed feature 56. As such, the second elastic force F2 of the second elastic member 54 is increased.

Figure 12:
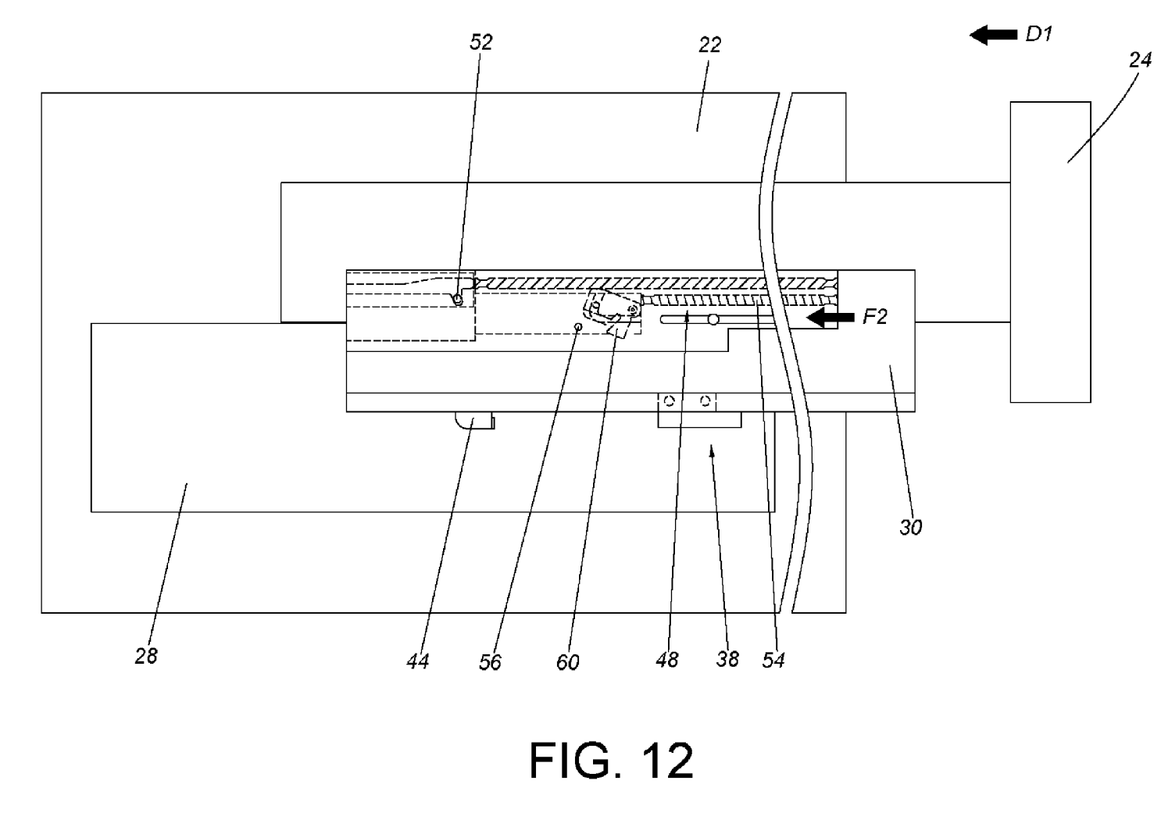
FIG. 12 is a diagram showing the second furniture part being moved along the first direction from an open position to a first position.
Figure 13:
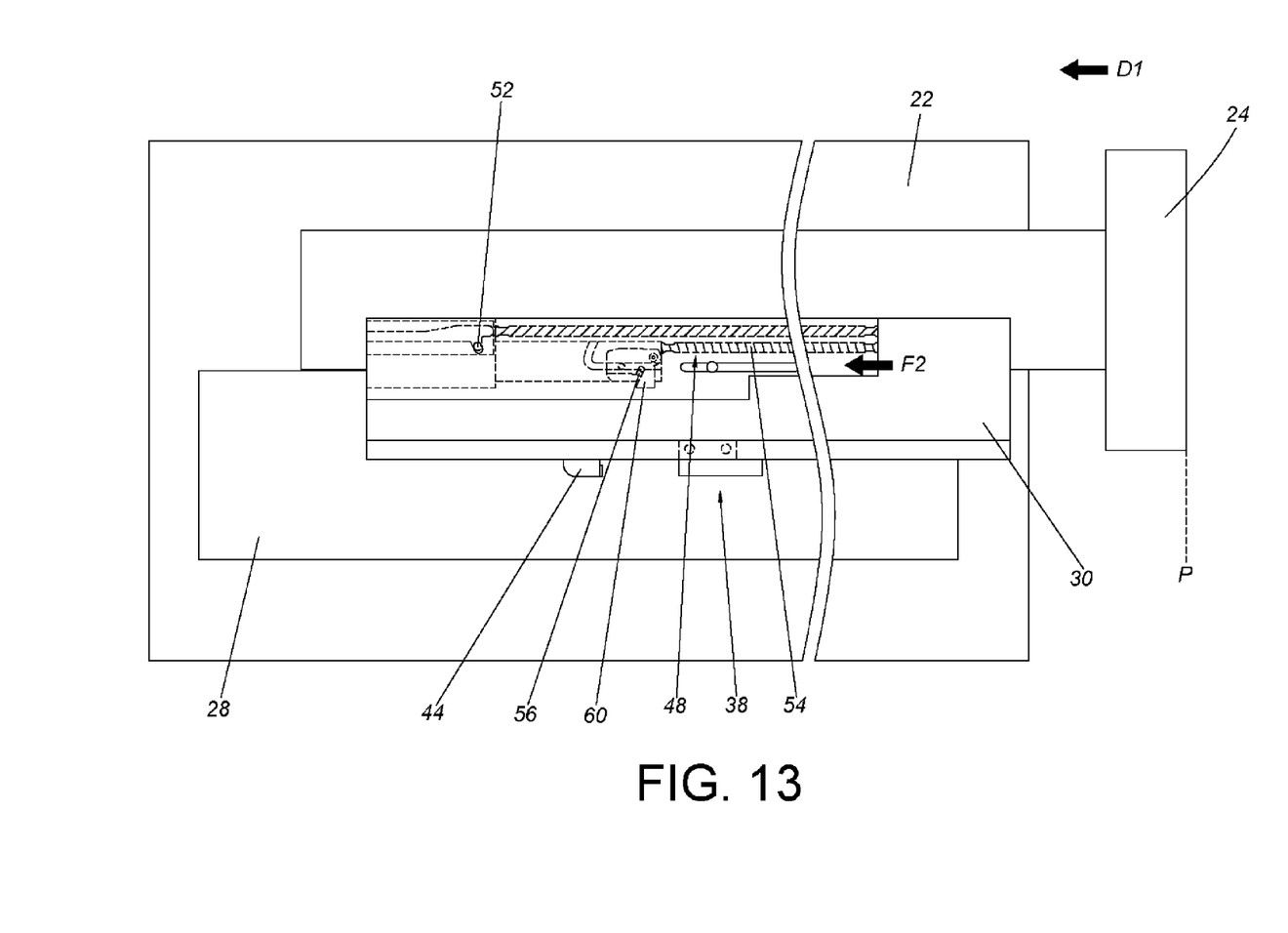
FIG. 13 is a diagram showing the second furniture part being moved along the first direction from the open position to a second position.

As shown in FIG. 12 and FIG. 13, when the user pushes the second furniture part 24 (or the second rail 30) to move relative to the first furniture part 22 (or the first rail 28) from an open position to a predetermined position P along the first direction D1 (that is to say, the retracted direction), the fixed feature 56 arranged on the first rail 28 is captured by the capturing mechanism 60 of the second driving device 48, and the second elastic member 54 releases the second elastic force F2 immediately, so as to drive the second furniture part 24 (or the second rail 30) to close relative to the first furniture part 22 (or the first rail 28). That is so-called a self-closing function. Wherein, a direction of the second elastic force F2 of the second driving device 48 is identical to the first direction D1.

Figure 14:
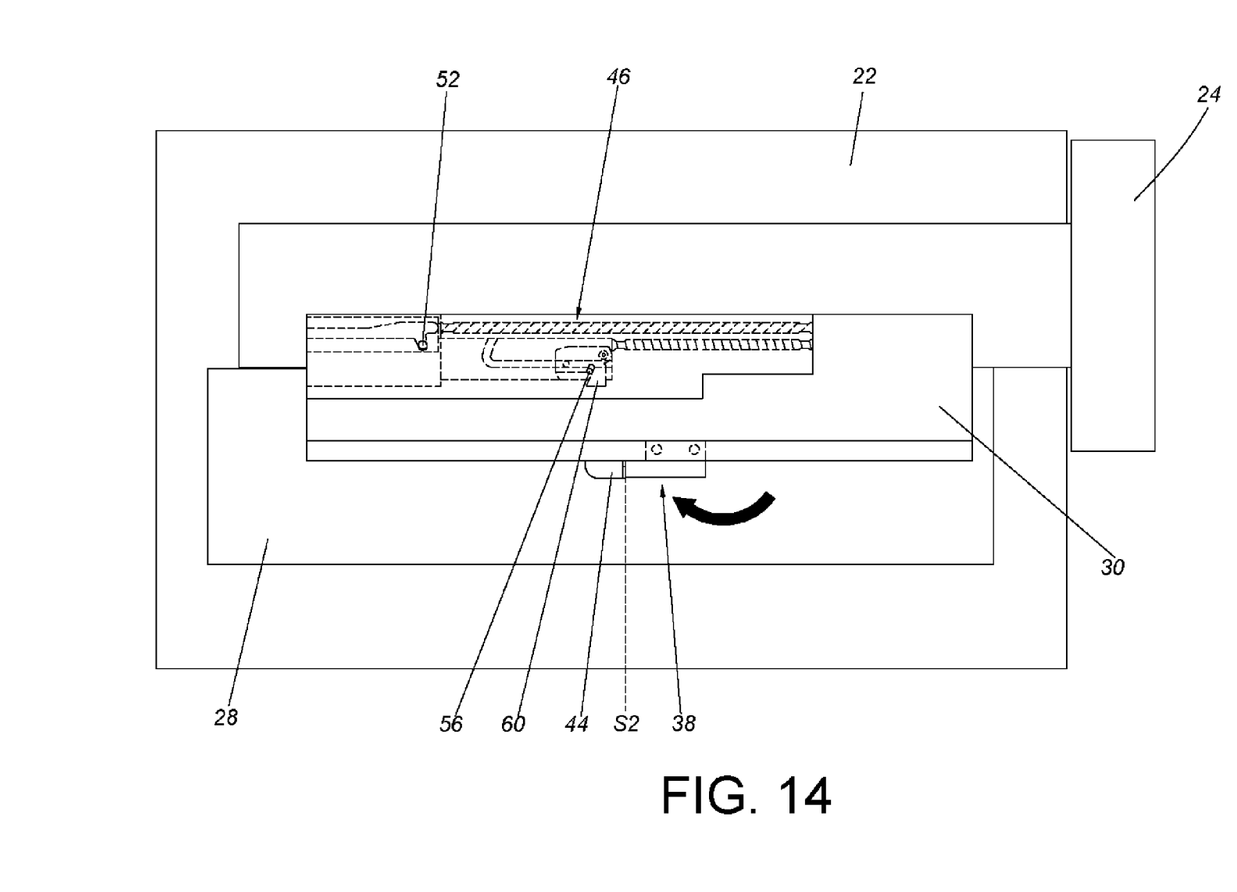
FIG. 14 is a diagram showing the second furniture part of the furniture assembly being located at the retracted position relative to the first furniture part according to an embodiment of the present invention, wherein the switch is in the second state.
Figure 15:
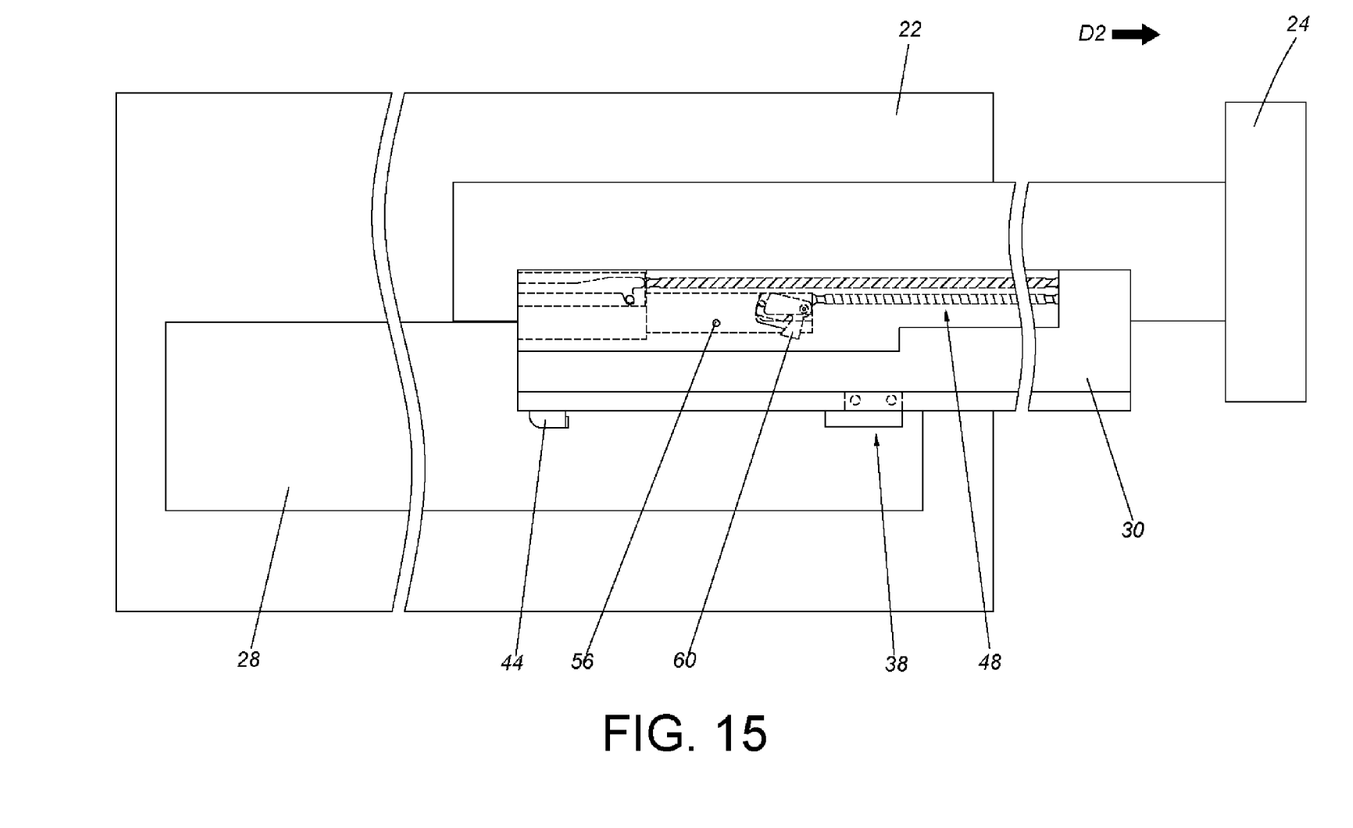
FIG. 15 is a diagram showing the second furniture part being opened and moved along a second direction from the retracted position.

As shown in FIG. 14 and FIG. 15, when the second furniture part 24 (or the second rail 30) is located at a retracted position relative to the first furniture part 22 (or the first rail 28), and the switch 38 is in the second state S2, the switch 38 abuts against or is adjacent to the abutting feature 44 of the first rail 28, such that the second furniture part 24 (or the second rail 30) cannot be pushed to open relative to the first furniture part 22 (or the first rail 28). In other words, when the switch 38 is operated to be in the second state S2, the first driving device 46 is disabled while the second driving device 48 is still enabled. Therefore, the slide rail assembly still has the self-closing function.

In such state, the user still can open the second furniture part 24 (or the second rail 30) relative to the first furniture part 22 (or the first rail 28) along the second direction D2. In addition, when the user pushes the second furniture part 24 (or the second rail 30) to close relative to the first furniture part 22 (or the first rail 28) along the first direction D1, the capturing mechanism 60 of the second driving device 48 still can capture the fixed feature 56 on the first rail 28. Through the second driving device 48 releasing the second elastic force F2, the second furniture part 24 (or the second rail 30) is driven to close relative to the first furniture part 22 (or the first rail 28).

As mentioned above, the present invention allows the user to disable the push-open function of the slide rail assembly according to use environment or conditions, and the slide rail assembly can still keep the self-closing function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
    a first rail;
    a second rail movable relative to the first rail;
    a first driving device configured to drive the second rail to open relative to the first rail when the second rail is pushed at a retracted position along a first direction;
    a second driving device configured to drive the second rail to close relative to the first rail when the second rail is moved from an open position to a predetermined position along the first direction; and
    a switch configured to enable the first driving device in a first state and disable the first driving device in a second state.

2. The slide rail assembly of claim 1, wherein the first driving device is arranged on the second rail, the first driving device comprises a first elastic member and a locking mechanism, the first elastic member is configured to provide a first elastic force along a direction opposite to the first direction, the locking mechanism is configured to be operated between a locking state and an unlocking state, when the locking mechanism is in the locking state, the first elastic member accumulates the first elastic force, and when the locking mechanism in the unlocking state, the first elastic member releases the first elastic force.

3. The slide rail assembly of claim 1, wherein the second driving device is arranged on the second rail, the second driving device comprises a second elastic member, a guiding mechanism and a capturing mechanism, the second elastic member is configured to provide a second elastic force along a direction identical to the first direction, a fixed feature is fixedly arranged on the first rail, the guiding mechanism has a first path and a second path deflected relative to the first path; when the capturing mechanism is located in the first path of the guiding mechanism, the fixed feature is captured by the capturing mechanism; and when the capturing mechanism is located in the second path of the guiding mechanism, the capturing mechanism is detached from the fixed feature.

4. The slide rail assembly of claim 1, wherein the switch is movably mounted to the second rail, the first rail comprises an abutting feature; when the switch is in the first state, a predetermined gap is formed between the switch and the abutting feature for enabling the first driving device; and when the switch is in the second state, the switch abuts against or is adjacent to the abutting feature for disabling the first driving device.

5. The slide rail assembly of claim 4, further comprising a base attached to the second rail, wherein the second rail is formed with an opening for allowing the base to pass through, and the switch is movably mounted to the base.

6. The slide rail assembly of claim 1, wherein the switch is a manual switch.

7. A slide rail assembly, comprising:
a first rail configured to be mounted to a first furniture part of a furniture assembly;
a second rail movable relative to the first rail, the second rail configured to carry a second furniture part of the furniture assembly;
a first driving device configured to drive the second furniture part to open relative to the first furniture part when the second furniture part is pushed at a retracted position along a first direction;
a second driving device configured to drive the second furniture part to close relative to the first furniture part when the second furniture part is moved from an open position to a predetermined position along the first direction; and
a switch configured to enable the first driving device in a first state and disable the first driving device in a second state.

8. The slide rail assembly of claim 7, wherein the first driving device is arranged on the second rail, the first driving device comprises a first elastic member and a locking mechanism, the first elastic member is configured to provide a first elastic force along a direction opposite to the first direction, the locking mechanism is configured to be operated between a locking state and an unlocking state, when the locking mechanism is in the locking state, the first elastic member accumulates the first elastic force, and when the locking mechanism in the unlocking state, the first elastic member releases the first elastic force.

9. The slide rail assembly of claim 7, wherein the second driving device is arranged on the second rail, the second driving device comprises a second elastic member, a guiding mechanism, and a capturing mechanism, the second elastic member is configured to provide a second elastic force along a direction identical to the first direction, a fixed feature is fixedly arranged on the first rail, the guiding mechanism has a first path and a second path deflected relative to the first path; when the capturing mechanism is located in the first path of the guiding mechanism, the fixed feature is captured by the capturing mechanism; and when the capturing mechanism is located in the second path of the guiding mechanism, the capturing mechanism is detached from the fixed feature.

10. The slide rail assembly of claim 7, wherein the switch is movably mounted to the second rail, the first rail comprises an abutting feature; when the switch is in the first state, a predetermined gap is formed between the switch and the abutting feature for enabling the first driving device; and when the switch is in the second state, the switch abuts against or is adjacent to the abutting feature for disabling the first driving device.

11. The slide rail assembly of claim 10, further comprising a base attached to the second rail, wherein the second rail is formed with an opening for allowing the base to pass through, and the switch is movably mounted to the base.

12. A slide rail assembly, comprising:
a first rail;
a second rail movable relative to the first rail;
a first driving device configured to drive the second rail to open relative to the first rail when the second rail is pushed at a retracted position along a first direction; and
a switch operatively connected to the second rail, the switch configured to be operated between a first state and a second state; wherein when the switch is in the first state, the switch is configured to enable the first driving device; and when the switch is in the second state, the switch is configured to disable the first driving device.

13. The slide rail assembly of claim 12, further comprising a third rail movably arranged between the first rail and the second rail, and a second driving device configured to drive the second rail to close relative to the first rail when the second rail is moved from an open position to a predetermined position along the first direction.

14. The slide rail assembly of claim 13, wherein the second driving device is arranged on the second rail, the second driving device comprises a second elastic member, a guiding mechanism, and a capturing mechanism, the second elastic member is configured to provide a second elastic force along a direction identical to the first direction, a fixed feature is fixedly arranged on the first rail, the guiding mechanism has a first path and a second path deflected relative to the first path; when the capturing mechanism is located in the first path of the guiding mechanism, the fixed feature is captured by the capturing mechanism; and when the capturing mechanism is located in the second path of the guiding mechanism, the capturing mechanism is detached from the fixed feature.

15. The slide rail assembly of claim 12, wherein the first driving device is arranged on the second rail, the first driving device comprises a first elastic member and a locking mechanism, the first elastic member is configured to provide a first elastic force along a direction opposite to the first direction, the locking mechanism is configured to be operated between a locking state and an unlocking state; when the locking mechanism is in the locking state, the first elastic member accumulates the first elastic force; and when the locking mechanism in the unlocking state, the first elastic member releases the first elastic force.

16. The slide rail assembly of claim 12, wherein the first rail comprises an abutting feature; when the switch is in the first state, a predetermined gap is formed between the switch and the abutting feature for enabling the first driving device; and when the switch is in the second state, the switch abuts against or is adjacent to the abutting feature for disabling the first driving device.

17. The slide rail assembly of claim 16, further comprising a base attached to the second rail, wherein the second rail is formed with an opening for allowing the base to pass through, and the switch is movably mounted to the base.

18. The slide rail assembly of claim 12, wherein the switch is a manual switch.

19. The slide rail assembly of claim 12, wherein the first rail is mounted to a first furniture part, and the second rail is configured to carry a second furniture part.

20. The slide rail assembly of claim 19, wherein the first furniture part is a cabinet, and the second furniture part is a drawer.

* * * * *